US009552039B2

(12) United States Patent
Muralidhar et al.

(10) Patent No.: US 9,552,039 B2
(45) Date of Patent: Jan. 24, 2017

(54) CONSTRAINED BOOT TECHNIQUES IN MULTI-CORE PLATFORMS (71) Applicants: Rajeev Muralidhar, Bangalore (IN); Harinarayanan Seshadri, Bangalore (IN); Vishwesh M. Rudramuni, Bangalore (IN)

(72) Inventors: Rajeev Muralidhar, Bangalore (IN); Harinarayanan Seshadri, Bangalore (IN); Vishwesh M. Rudramuni, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 14/125,497

(22) PCT Filed: Sep. 27, 2012

(86) PCT No.: PCT/US2012/057597
§ 371 (c)(1),
(2) Date: Dec. 11, 2013

(87) PCT Pub. No.: WO2013/049371
PCT Pub. Date: Apr. 4, 2013

(65) Prior Publication Data
US 2014/0115368 A1 Apr. 24, 2014

(30) Foreign Application Priority Data
Sep. 30, 2011 (IN) .............. 2848/DEL/2011

(51) Int. Cl.
G06F 1/32 (2006.01)
G06F 9/44 (2006.01)
(52) U.S. Cl.
CPC ............ G06F 1/3206 (2013.01); G06F 1/3287 (2013.01); G06F 9/4405 (2013.01); Y02B 60/1282 (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS 6,260,150 B1 7/2001 Diepstraten et al.
6,317,839 B1 11/2001 Wells
(Continued)

FOREIGN PATENT DOCUMENTS

CN 1690924 A 11/2005
EP 1589403 A2 10/2005
(Continued)

OTHER PUBLICATIONS

Notice of Allowance received for Taiwan Patent Application No. 101135104, mailed on Jun. 27, 2014, 2 pages of English Translation and 1 page of Notice of Allowance.
(Continued)

Primary Examiner — Zahid Choudhury
(74) Attorney, Agent, or Firm — Alpine Technology Law Group LLC (57) ABSTRACT Methods and apparatus relating to constrained boot techniques in multi-core platforms are described. In one embodiment, a processor may include logic that controls which specific core(s) are to be powered up/down and/or which power state these core(s) need to enter based, at least in part, on input from OS and/or software application(s). Other embodiments are also claimed and disclosed.

29 Claims, 6 Drawing Sheets

(56) References Cited

U.S. PATENT DOCUMENTS

| | | | |
|---|---|---|---|
| 6,802,018 | B2 | 10/2004 | Bormann et al. |
| 7,165,132 | B1 | 1/2007 | Asato et al. |
| 7,313,797 | B2 | 12/2007 | Sundaram et al. |
| 7,962,771 | B2 | 6/2011 | Song et al. |
| 8,775,836 | B2 | 7/2014 | Muralidhar et al. |
| 2005/0010828 | A1 | 1/2005 | Oh |
| 2005/0215274 | A1 | 9/2005 | Matson et al. |
| 2005/0239518 | A1 | 10/2005 | D'Agostino et al. |
| 2005/0273601 | A1* | 12/2005 | Buch .................... G06F 9/50 713/161 |
| 2006/0212727 | A1 | 9/2006 | Judge et al. |
| 2007/0079160 | A1 | 4/2007 | Douniwa |
| 2007/0245164 | A1* | 10/2007 | Mitarai ................ G06F 1/3203 713/320 |
| 2008/0098245 | A1 | 4/2008 | Hogan et al. |
| 2008/0201716 | A1 | 8/2008 | Du et al. |
| 2008/0244227 | A1 | 10/2008 | Gee et al. |
| 2008/0307244 | A1 | 12/2008 | Bertelsen et al. |
| 2009/0089562 | A1 | 4/2009 | Schuchman et al. |
| 2009/0119495 | A1 | 5/2009 | Khatri |
| 2009/0144519 | A1 | 6/2009 | Codrescu et al. |
| 2009/0307708 | A1 | 12/2009 | Archer et al. |
| 2009/0313492 | A1 | 12/2009 | Lerman |
| 2010/0146513 | A1 | 6/2010 | Song |
| 2010/0275045 | A1 | 10/2010 | Qin et al. |
| 2010/0293401 | A1 | 11/2010 | De Cesare et al. |
| 2011/0022833 | A1 | 1/2011 | Nussbaum et al. |
| 2011/0099747 | A1 | 5/2011 | Kim et al. |
| 2011/0145624 | A1 | 6/2011 | Rychlik et al. |
| 2011/0191607 | A1 | 8/2011 | Gunther et al. |
| 2011/0264934 | A1 | 10/2011 | Branover et al. |
| 2012/0102344 | A1 | 4/2012 | Kocev et al. |
| 2012/0166779 | A1 | 6/2012 | Muralidhar et al. |
| 2013/0262902 | A1* | 10/2013 | Herdrich ............. G06F 9/5094 713/323 |

FOREIGN PATENT DOCUMENTS

| | | |
|---|---|---|
| JP | 2009-223684 A | 1/2009 |
| JP | 2009-223687 A | 10/2009 |
| JP | 6972981 | 7/2016 |
| KR | 10-0563691 B1 | 3/2006 |
| KR | 10-2009-0046841 | 5/2009 |
| KR | 2010-0122875 A | 11/2010 |
| TW | 201022923 A1 | 6/2010 |
| TW | 201115325 A1 | 5/2011 |
| WO | 2013/049371 A2 | 4/2013 |
| WO | 2013/049371 A3 | 5/2013 |

OTHER PUBLICATIONS

International Preliminary Report on Patentability and Written Opinion received for PCT Patent Application No. PCT/US2012/057597, mailed on Apr. 10, 2014, 6 pages.
International Search Report and Written Opinion received for PCT Patent Application No. PCT/US2012/057597, mailed on Mar. 25, 2013, 9 pages.
Extended European Search Report received for European Patent Application 12836731.5, mailed on Apr. 8, 2015.
Office Action received for Japanese Patent Application No. 2014-532120, mailed on Apr. 28, 2015, 10 pages including 5 pages of English translation.
Notice of Allowance received for Korean Patent Application No. 10-2014-7008090, mailed on Nov. 25, 2015, 3 pages including 1 page of English translation.
Office Action received for Chinese Patent Application No. 201280047606.X, mailed on Apr. 19, 2016, 12 pages.
Office Action received for Korean Patent Application No. 2014-7008090, mailed on Aug. 17, 2015, 6 pages including 2 pages of English translation.
Office Action received for Chinese Patent Application No. 201280047606.X, mailed on Aug. 27, 2015, 13 pages.
Intel Corporation "New Intel Atom Processor-Based Platform Using Significantly Lower Power Readies Intel for Smartphone, Tablet Push", News Release, May 4, 2010, 2 pages, Santa Clara, CA.
International Preliminary Report on Patentablity received for International Patent Application No. PCT/US2011/063485, mailed on Jun. 25, 2013, 5 pages.
International Search Report and Written Opinion received for International Patent Application No. PCT/US2011/063485, mailed on Jun. 28, 2012.
Mudigonda, J, et al., "Using Asymmetric Single-ISA CMP's to Save Energy on Operating Systems", IEEE Mrcro Magazine, IEEE Computer Society, vol. 28, No. 3, May-Jun. 2008, pp. 26-41.
Shimpi, Anand L., "OS Driven Power Management, Intel Unveils Moorestown and the Atom Z600, The Fastest Smartphone Platform?", AnandTech, http://www.anandtech.com/show/3696/intel-unveils-moorestown-and-the-atom-z600-series-the-fastest-smartphone-processor/11, May 4, 2010.
Shimpi, Anand L., "Power Gating, Intel Unveils Morestown and the Atom Z600, The Fastest Smartphone Platform?", http://www.anandtech.com/show/3696/intel-unveils-moorestown-and-the-atom-z600-series-the-fastest-smartphone-processor/10, AnandTech, May 4, 2010.
Notice of Allowance issued in U.S. Appl. No. 13/075,057, mailed on Feb. 27, 2014, 7 pages.
Non-Final Rejection issued in U.S. Appl. No. 13/075,057, mailed on Sep. 19, 2013, 10 pages.
International Search Report and Written Opinion received for International Patent Application No. PCT/US2011/063907, mailed on Jun. 26, 2012, 8 pages.
Brown, "Suspend-to-RAM in Linux", Reprinted from the Proceedings of the Linux Symposium, Jul. 23-26, 2008, Ottawa, Ontario, Canada, 16 pages.
Notice of Allowance issued in U.S. Appl. No. 13/077,882, mailed on Jul. 29, 2013, 6 pages.
Non-Final Rejection issued in U.S. Appl. No. 13/077,882, mailed on Jan. 11, 2013, 12 pages.
Office Action received for Japanese Patent Application No. 2014-532120, mailed on Nov. 17, 2015, 3 pages including 1 page of English translation.
Notice of Allowance received for Japanese Patent Application No. 2014-532120 issue on Jun. 14, 2016, 3 pages including 4 pages of allowed claims in English.
Office Action received for European Patent Application No. 12 836 731.5, mailed on Sep. 9, 2016, 6 pages.
Office Action received for Chinese Patent Application No. 201280047606X, mailed on Sep. 30, 2016, 3 pages.

* cited by examiner

CONSTRAINED BOOT TECHNIQUES IN MULTI-CORE PLATFORMS

FIELD

The present disclosure generally relates to the field of electronics. More particularly, an embodiment of the invention relates to constrained boot techniques in multi-core platforms.

BACKGROUND

To improve performance, some systems include processors with multiple processing cores (also referred to as many-core systems). Currently, most of these systems are focused on providing high performance and there may be some limited power management built in at some level. For example, some of these many-core systems may have the ability to perform per core Cx states. Each C state may indicate a certain level of functionality. For example, C0 may indicate the processor is operating, C1 may indicate the processor is not executing instructions but may return to an executing state almost instantaneously, C2 may indicate the processor is to maintain all software-visible information but may take longer to return to full executing state, C3 may indicate the processor is asleep and does not need to keep its cache coherent, etc.

However, support for aggressive Operating System (OS) or Software (SW) driven power management is generally very minimal, especially front a OS perspective. Moreover, most current OS power management strategies tend not to scale very well with many-core systems from even a processor power management perspective, or the platform as a whole.

Accordingly, how the various power consumption states are utilized may have a direct impact on performance and/or power consumption of a processor.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" and "micro-operation" (uop) is interchangeable as discussed herein.

Some of the embodiments discussed herein may be utilized to provide constrained boot techniques in multi-core processors. As discussed herein, the term "constrained" boot or state generally refers to a state or boot technique where one or more processor cores enter or boot into a power consumption state that consumes less power than a fully operational power consumption state (e.g., not fully in C0 state). In some embodiments, at least some of the power consumption states discussed herein may be in accordance with those defined under Advanced Configuration and Power Interface (ACPI) specification, Revision 4.0a, Apr. 5, 2010.

In one embodiment, a processor may include logic, that controls which specific core(s) are to be powered up/down and/or which power state these core(s) need to enter based, at least in part, on input from OS software and/or software application(s). Moreover, the ability to control power up/down of cores and the level of power up/down may be used to optimize platform power consumption based on the workload, scenario, usage, etc. Furthermore, at least some OS operations discussed herein may be interchangeably performed by software applications, firmware, etc.

In an embodiment, when exiting from a low power state, only specific processor cores may be brought up to a full power state and the remaining processor cores may remain in a "constrained" state (e.g., not fully in C0). This will in turn greatly reduce overall platform power consumption.

Moreover, although many-core systems provide significant performance improvements, power management at the OS or SW level generally depends on legacy OS support. For example, some current OSes (such as Linux®) have support to power down/disable all non-hoot processors completely (e.g., the ones that are not critical for final power down/power up), but this approach may have high latency, high power impact, and also may needlessly (sometimes, depending on the scenario) power up all cores in the system completely (for example, a scenario where there is a single interrupt that needs to wake up the CPU core(s), and there is no real need to have all the CPUs up and running at the same time).

Figure 1:
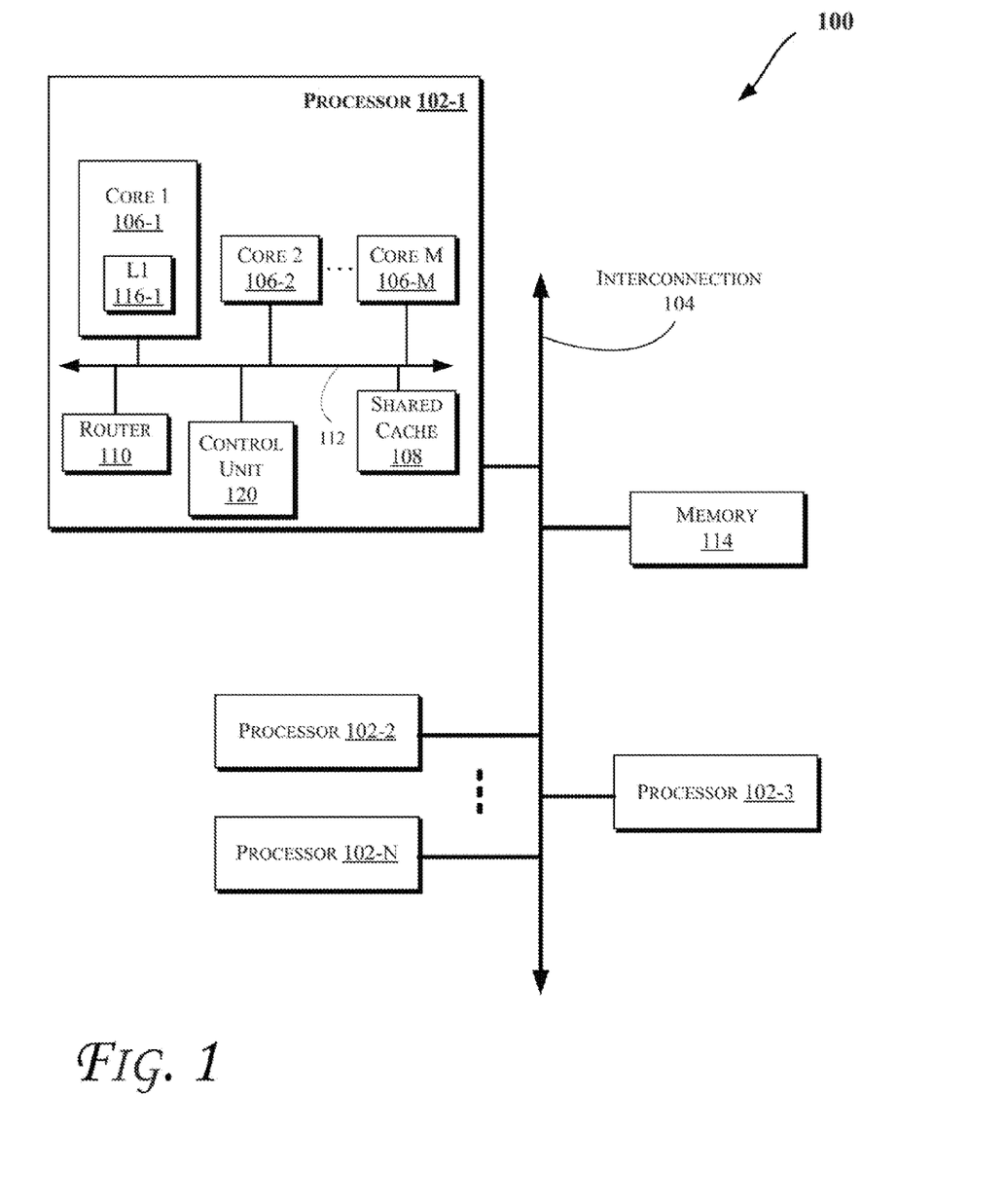
FIGS. 1, 5, and 6 illustrate block diagrams of embodiments of computing systems, which may be utilized to implement various embodiments discussed herein.

The techniques discussed herein may be used in any type of a processor with performance state settings, such as the processors discussed with reference to FIGS. 1 and 5-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, a router 110, and/or a processor control logic or unit 120. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, the control unit 120 may control which specific core(s) 106 are to be powered up/down and/or how much of these core(s) need to be brought up/down based on input from OS and/or software application(s) (e.g., that may be stored in the memory 114). Moreover, the control unit 120 may control power up/down of cores and the level of power up/down to optimize platform power consumption based on the workload, scenario, usage, etc. conditions present in the platform, e.g., as determined by an OS and/or a software application.

Figure 2:
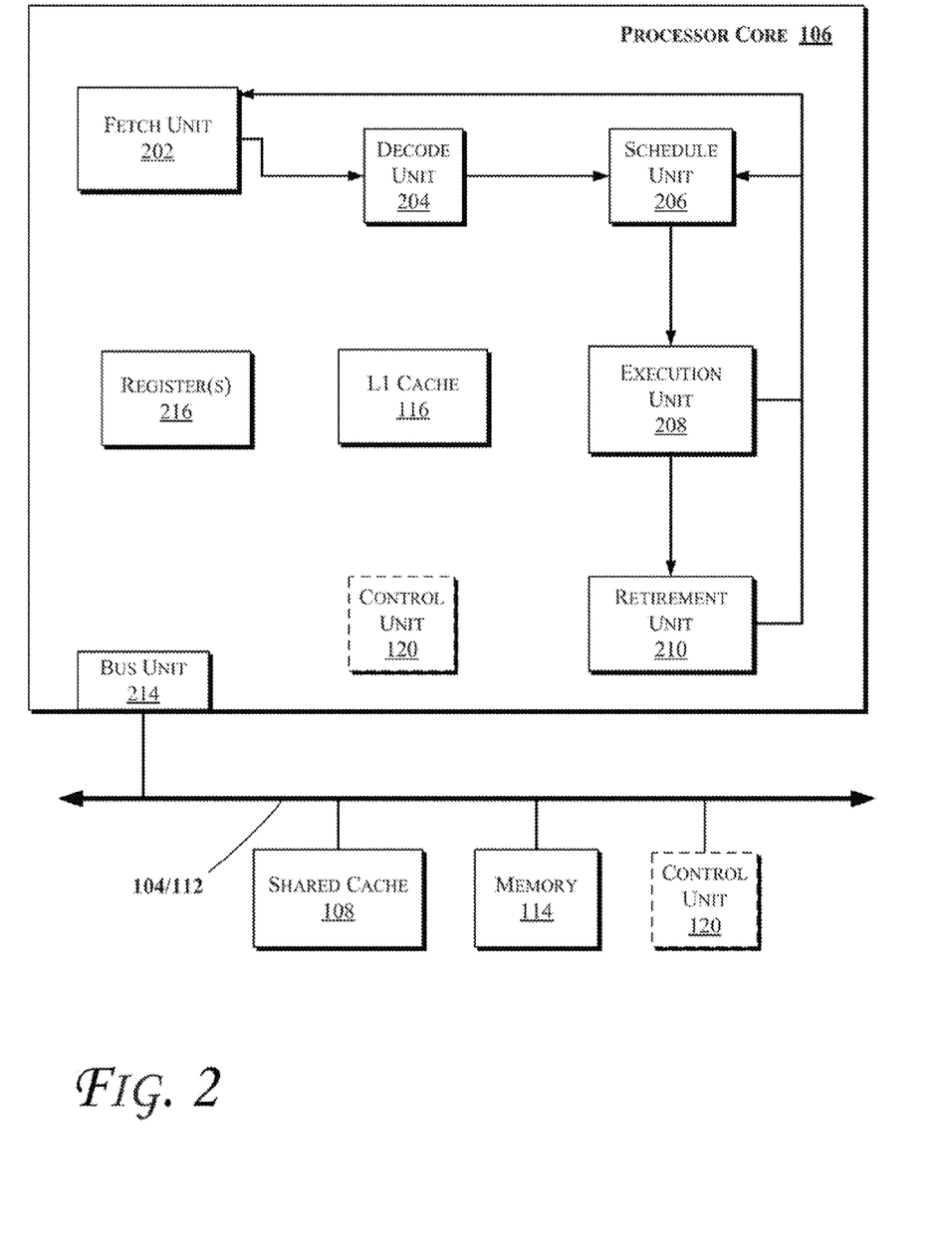
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 5-6. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to power consumption state settings).

Furthermore, even though FIG. 1 illustrates the control unit 120 to be coupled to the core 106 via interconnect 112, in various embodiments the control unit 120 may be located elsewhere such as inside the core 106, coupled to the core via bus 104, etc.

Figure 3:
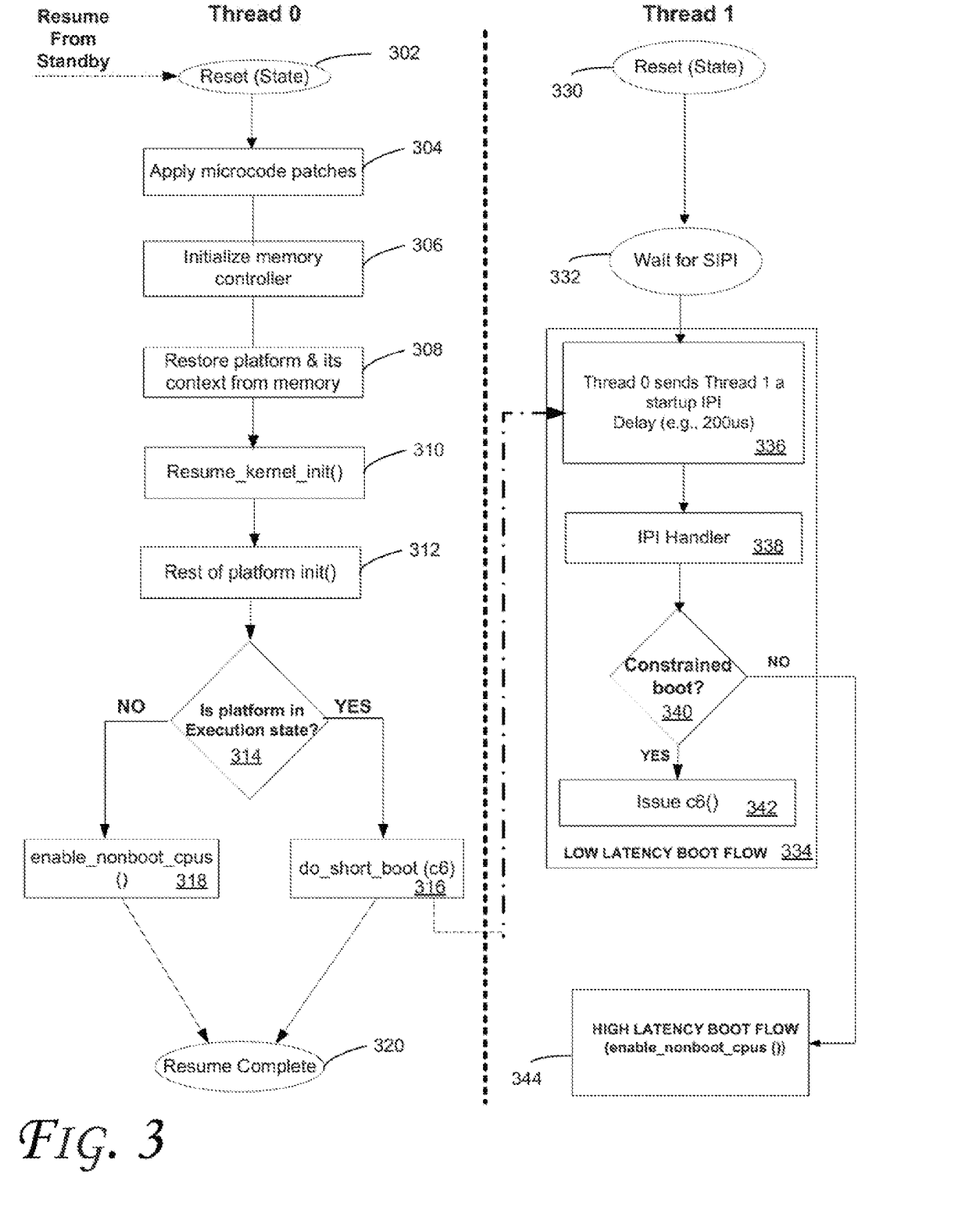
FIGS. 3-4 illustrate flow diagrams in accordance with some embodiments.

FIG. 3 illustrates a flow diagram of constrained initialization operations, according to an embodiment. In some embodiments, various components discussed with reference to FIGS. 1-2 and 4-6 may be utilized to perform one or more of the operations discussed with reference to FIG. 3. For example, the control unit 120 may be used to control power consumption states of one or more processor cores 106. In some embodiments, one or more of operations 304-308 may be performed by firmware. Also, one or more of operations 310-312, 318, 336, 338, and 344 may be performed by OS in various embodiments.

As discussed herein, a "thread" generally refers to a logical processor or the smallest unit of processing (which may be scheduled by an OS and/or software application). A "thread" may or may not share resources with another logical processor in the same physical semiconductor Integrated Circuit (IC) package. A "core" generally refers to a processor core that coexists with one or more other processor cores in the same physical semiconductor IC package. A processor core may or may not share resources with other processors or processor cores. A "package" generally refers to a physical IC chip that contains any number of cores and threads.

In some embodiments, architecturally, and without loss of generality, one may consider that on any many-core system, one or more of the following are present: (1) there is one Boot Strap Processor (BSP) core, or the main/primary processor core (or thread): (2) there are one or more non-BSP cores, which are secondary processor core(s) or processor threads (that rely on the BSP core to initiate/handle power management features or other features shared between one or more processor cores in the platform, for example).

In some embodiments, OS routines that change the state of non-BSP processor may include: "disable_nonboot_cpus( )" and "enable_nonboot_cpus( )"—for disabling and enabling the non-BSP core processor(s), respectively. In a general resume sequence, once the processor is reset at 302 (and optionally microcode patches are loaded at 304), the boot flow goes through the "enable_nonboot_cpus( )" flow to enable non-BSP cores. This may include:

(1) Startup Inter-Processor Interrupt (SIPI): In order to wake up secondary threads or cores, the BSP sends a SIPI to each thread and core. This SIPI may be sent by using the BSP's LAPIC (Local Advanced Programmable Interrupt Controller), e.g., indicating the physical address that the Application Processor (AP) should start executing from.

(2) AP Woken Up state: Upon receipt of the SIPI, the AP will start executing the code pointed to by the SIPI message.

Once the firmware is ready to attempt to boot an OS, all AP processors are placed back in their power-on state ("Wait-for-SIPI") at 332 (as will be further discussed below), which may be accomplished by the BSP core sending an INIT ASSERT IPI followed by an INIT DEASSERT IPI to all APs in the system (all except the originating core). This process normally has a high latency, and if this process has to be repeated for all the non-BSP cores in the platform/processor, it may significantly increase latency for the overall platform resume process.

In accordance with some embodiments, booting the non-BSP core to a constrained state may be optimized by having a low latency short boot flow as shown in FIG. 3. While entry into package level C6 is discussed with reference to FIG. 3, other package levels may be entered (e.g., other than C0) in various embodiments. Generally, to enter a package level C6 (deepest X86 processor state) the threads of the core should have requested a C6, otherwise microcode may pick up the lower of the two processor thread states.

In some embodiments, thread 0 or BSP core may perform operations 302-320 as shown in FIG. 3. For example, after reset state 302 (e.g., from a standby state or idle state as discussed with reference to FIG. 4), microcode patches may be optionally applied at 304. At 306, a memory controller (such as memory controller 510 of FIG. 5) may be initialized. At 308, the platform and its context may be restored (e.g., from memory 114 of FIG. 1 or memory 512 of FIG. 5). OS kernel is resumed at 310. At 312, the rest of the platform may be initialized. If at 314 the platform is determined to be in execution state by thread 0/BSP core, short boot (e.g., to C6) may be performed at 316; otherwise, non-boot cores may be enabled at 318. At 320 the resume from standby is complete.

Referring to FIG. 3, thread 1 or non-BSP core may perform operations 330-344. Namely, a first non-BSP core may be booted into a constrained boot state per flow 334 and after reset state 330. More particularly, at 332, the first non-BSP core may wait for SIPI (e.g., front 316) as discussed above. At 336, thread 1 may receive IPIs (e.g., from thread 0 at 316) and as a part of IPI handler at 338 requests for C6 may be made repeatedly in some embodiments. At 340, if it is determined that constrained boot is to be entered, e.g., when all corresponding tasks on thread 1 are done, deep sleep state (e.g., C6) may be entered at 342. Otherwise, a high latency boot flow may be performed at 344, e.g., by enabling low memory for initialization of Memory Management Unit (MMU, such as memory controller 510 of FIG. 5). Also, at 344, per core GDT (Global Descriptor Table) and/or TSS (Task-State Segment) may be set up. Also, at 344, floating point initialization and/or synchronization with BP (Boot Processor) enable local interrupts may be performed in some embodiments. Further, when the platform is woken up in response to a non-timer interrupt, OS may enable the non-BSP thread and initialize it to previous known good state to not compromise performance when the platform is in an active state.

This short boot flow 334 may be used in several cases. For example, for timer wake execution state, in an idle scenario when the platform is woken just to perform an OS synchronization because of a timer interrupt, there is a potential to enter a deep sleep state again, relatively soon after processing the timer interrupt. In this scenario, the non-BSP processor thread is brought to its full potential and an attempt is to enter deep sleep state again, there is potentially a significant power consumption penalty. Instead, the non-BSP thread may boot to a constrained state and caused to enter a deep sleep state with less power consumption penalty.

Figure 4:
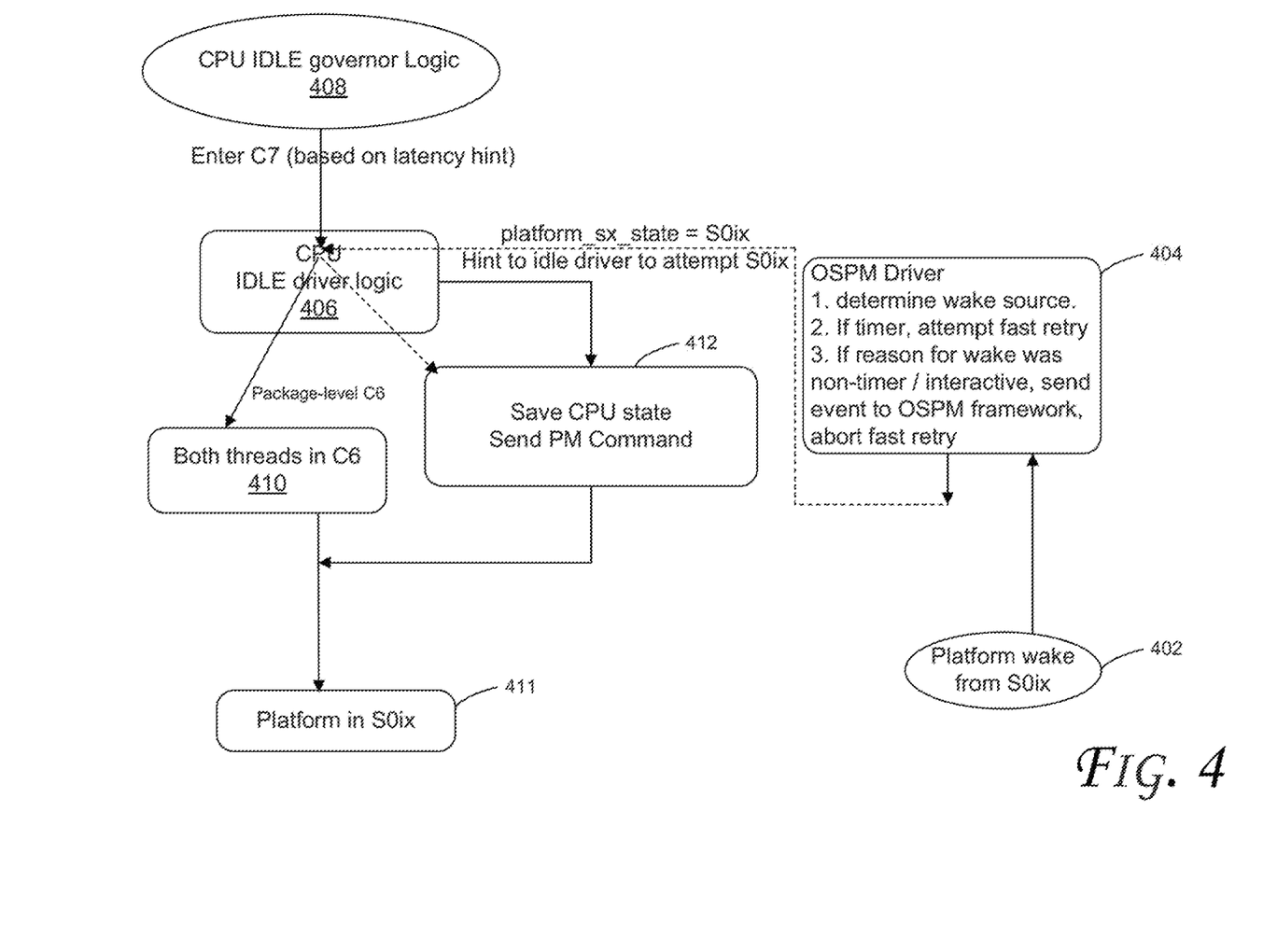

FIG. 4 illustrates a flow diagram of constrained initialization operations for timer-based interrupt processing during idle, according to an embodiment. In some embodiments, various components discussed with reference to FIGS. 1-3 and 5-6 may be utilized to perform one or more of the operations discussed with reference to FIG. 3. For example, the control unit 120 may be used to control power consumption states of one or more processor cores 106.

After platform wakes from S0ix at 402, OS (e.g., OS Power Management (OSPM) driver) may determine the wake source at 404. "S0ix" generally refers to improved idle power state(s) achieved by platform-level power management that is event driven (e.g., based on OS or software application input) instead of traditional idle power state that is driven either by a user or if platform was idle for too long (a pre-programmed time). If the reason for wake at 402 is non-timer or interactive, the event may be sent to and handled by the OSPM framework without fast retry.

In an embodiment, if the platform power state is S0ix, this may be treated as a hint to retry for S0ix state. A CPU idle driver logic 406 (which may be implemented in the control unit 120 in one embodiment) receives a message or signal from OSPM driver 404 and causes saving of the CPU state at 412. Also, a power management command may be sent to (e.g., south) complex System Controller Unit (SCU) (for S0i2/3) and the CPU state may be stored in SCU memory (e.g., SRAM) at 412 in accordance with an embodiment. If at 410, both BSP and non-BSP cores/threads are in deep sleep (e.g., C6) state, the platform enters S0ix at 411. As shown in FIG. 4, a CPU idle governor logic 408 (which may be implemented in the control unit 120 in one embodiment) may communicate with the logic 406 to enter an even deeper state (e.g., C7), e.g., based on latency hint associated with transmission delay value.

Some embodiments provide techniques to: (1) selectively boot non-BSP core(s) either to a full potential state or a "constrained state" based on the platform idleness and/or based on the source of wakes to platform; (2) boot the platform faster by reducing the latency of booting the non-BSP core; and/or (3) reduce the time spent in full power state (e.g., C0) which in turn will help save power.

Figure 5:
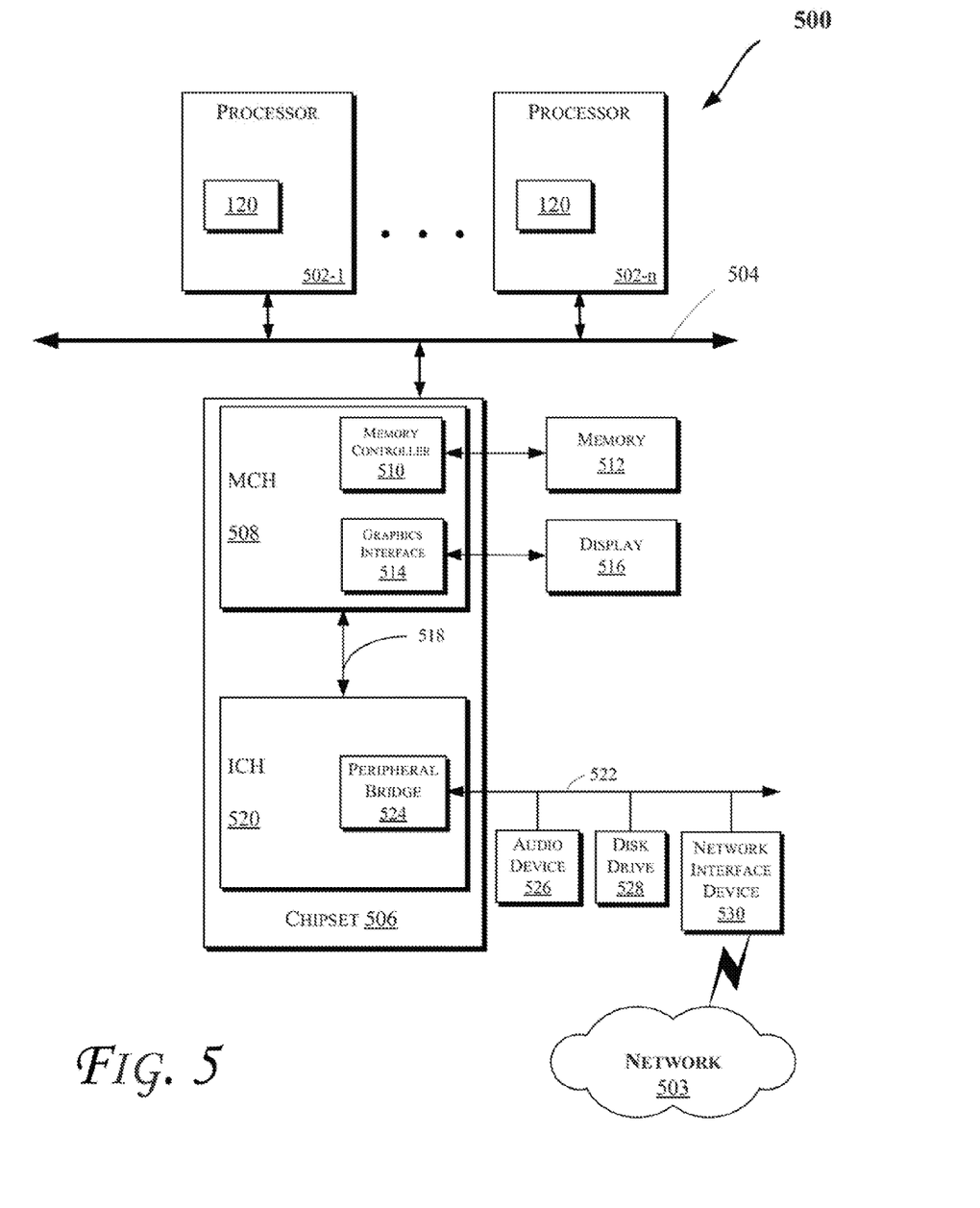

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include the control unit 120 discussed with reference to FIGS. 1-4. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic, data (e.g., including instructions).

Figure 6:
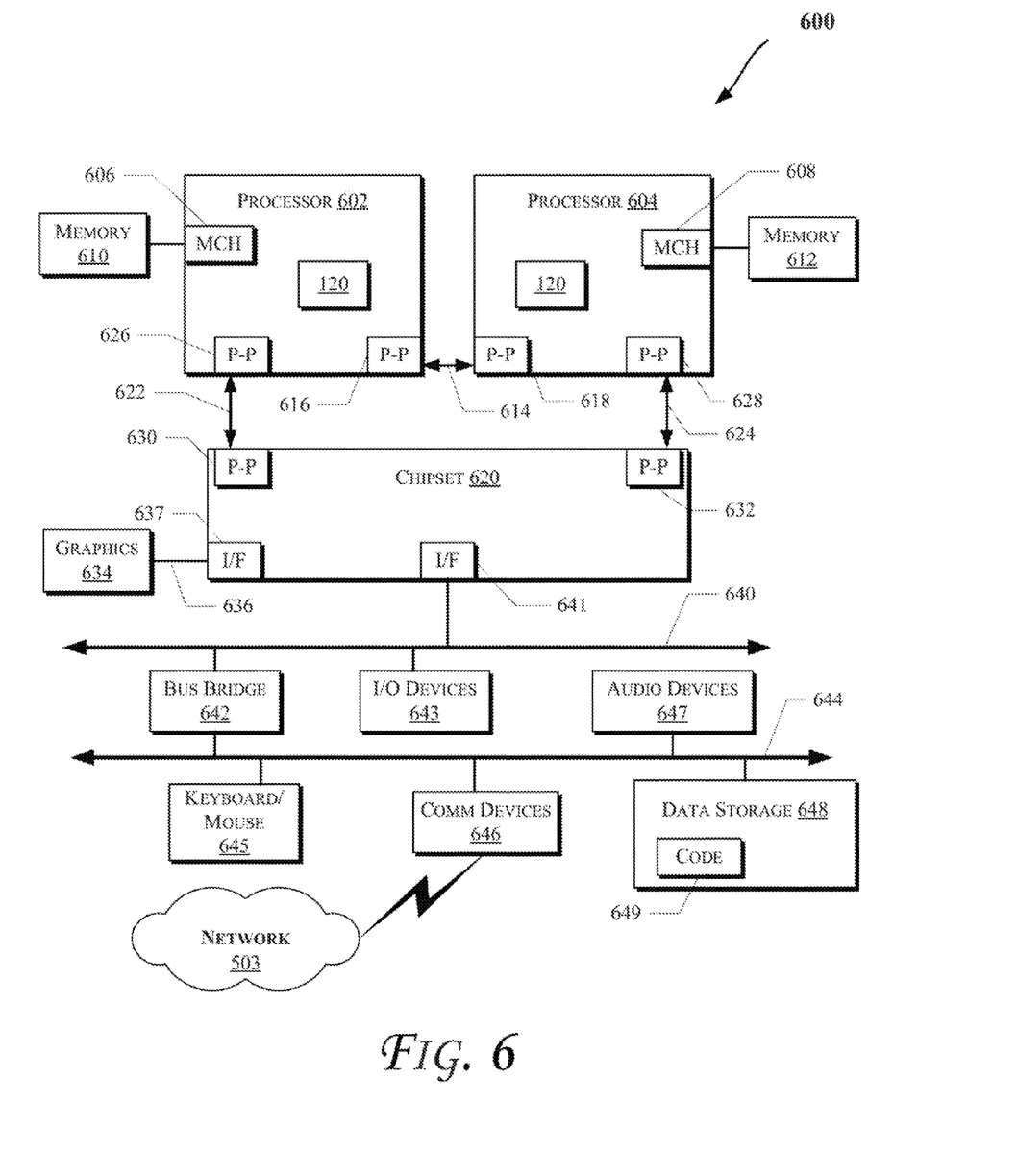

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, the control unit 120 of FIGS. 1-4 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a plurality of processor cores; and control logic, coupled to a first processor core and a second processor core of the plurality of processor cores, to detect a wake event from a low power consumption state and to cause the second processor core of the plurality of processor cores to enter a reduced power consumption state that consumes less power than a fully operational power consumption state, wherein, in response to the wake event, the control logic is to cause the first processor core to enter the fully operational power consumption state, wherein the control logic is to cause any remaining processor cores from the plurality of the processor cores, including the second processor core, to enter the reduced power consumption state based on a source of the wake event, wherein the first processor core is a bootstrap processor core and the second processor core is a non-bootstrap processor core.

2. The processor of claim 1, wherein a third processor core of the plurality of processor cores is to enter the fully operational power consumption state in response to the wake event.

3. The processor of claim 1, further comprising memory to store an operating system software, wherein the operating system software is to trigger the wake event.

4. The processor of claim 3, wherein the operating system software is to trigger the wake event based on a timer.

5. The processor of claim 1, wherein the control logic is to determine whether the second processor core is to enter the reduced power consumption state based on one or more of workload, scenario, and usage conditions present in a platform that comprises the processor.

6. The processor of claim 1, wherein the low power consumption state comprises an idle state or a standby state.

7. The processor of claim 1, further comprising memory to store an application software, wherein the application software is to trigger the wake event.

8. The processor of claim 7, wherein the application software is to trigger the wake event based on a timer.

9. The processor of claim 1, wherein the first processor core is to transmit at least one inter-processor interrupt to the second processor core in response to the wake event.

10. The processor of claim 1, wherein the wake event is to indicate resumption from a platform idle state.

11. A method comprising: detecting a wake event from a low power consumption state at a first processor core of a processor; and cause a second processor core of the processor to enter a power consumption state that consumes less power than a fully operational power consumption state,
wherein, in response to the wake event, the first processor core is caused to enter the fully operational power consumption state, wherein any remaining processor cores from a plurality of the processor cores of the processor, including the second processor core, enters the reduced power consumption state based on a source of the wake event, wherein the first processor core is a bootstrap processor core and the second processor core is a non-bootstrap processor core.

12. The method of claim 11, further comprising causing a third processor core of the processor to enter the fully operational power consumption state in response to the wake event.

13. The method of claim 11, further comprising executing code to trigger the wake event.

14. The method of claim 11, further comprising determining whether the second processor core is to enter the reduced power consumption state based on one or more of workload, scenario, and usage conditions present in a platform that comprises the processor.

15. The method of claim 11, further comprising the first processor core transmitting at least one inter-processor interrupt to the second processor core in response to the wake event.

16. A computing system comprising:
memory to store an operating system software power management driver; and a processor, coupled to the memory, to execute the operating system software power management driver, the processor comprising:
a plurality of processor cores; and control logic coupled to a first processor core and a second processor core of the plurality of processor cores, to detect a wake event from a low power consumption state and to cause the second processor core of the plurality of processor cores to enter a power consumption state that consumes less power than a fully operational power consumption state,
wherein, in response to the wake event, the control logic is to cause the first processor core to enter the fully operational power consumption state, wherein the control logic is to cause any remaining processor cores from the plurality of the processor cores, including the second processor core, to enter the reduced power consumption state based on a source of the wake event, wherein the first processor core is a bootstrap processor core and the second processor core is a non-bootstrap processor core.

17. The system of claim 16, wherein a third processor core of the plurality of processor cores is to enter the fully operational power consumption state in response to the wake event.

18. The system of claim 16, wherein the operating system software power management driver is to trigger the wake event.

19. The system of claim 18, wherein the operating system software power management driver is to trigger the wake event based on a timer.

20. The system of claim 16, wherein the control logic is to determine whether the second processor core is to enter the reduced power consumption state based on one or more of workload, scenario, and usage conditions present in the computing system.

21. The system of claim 16, wherein the low power consumption state comprises an idle state or a standby state.

22. The system of claim 16, wherein the memory is to store an application software, wherein the application software is to trigger the wake event.

23. The system of claim 22, wherein the application software is to trigger the wake event based on a timer.

24. The system of claim 16, wherein the first processor core is to transmit at least one inter-processor interrupt to the second processor core in response to the wake event.

25. A non-transitory computer-readable medium to store instructions that when executed by a processor cause the processor to:

detect a wake event from a low power consumption state at a first processor core of the processor; and cause a second processor core of the processor to enter a power consumption state that consumes less power than a fully operational power consumption state, wherein, in response to the wake event, the first processor core is caused to enter the fully operational power consumption state, wherein any remaining processor cores from a plurality of the processor cores of the processor, including the second processor core, is to enter the reduced power consumption state based on a source of the wake event, wherein the first processor core is a bootstrap processor core and the second processor core is a non-bootstrap processor core.

26. The computer-readable medium of claim 25, wherein the instructions are to cause a third processor core of the processor to enter the fully operational power consumption state in response to the wake event.

27. The computer-readable medium of claim 25, wherein the instructions are to cause the processor to execute code to trigger the wake event.

28. The computer-readable medium of claim 25, wherein the instructions are to cause the first processor core to determine whether the second processor core is to enter the reduced power consumption state based on one or more of workload, scenario, and usage conditions present in a platform that comprises the processor.

29. The computer-readable medium of claim 25, wherein the instructions are to cause the first processor core to transmit at least one inter-processor interrupt to the second processor core in response to the wake event.

* * * * *